(12) United States Patent
Murase

(10) Patent No.: US 8,745,289 B2
(45) Date of Patent: Jun. 3, 2014

(54) IMAGE PROCESSING APPARATUS, METHOD FOR CONTROLLING THE IMAGE PROCESSING APPARATUS, AND COMPUTER-READABLE STORAGE MEDIUM

(75) Inventor: Yoko Murase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/634,457

(22) Filed: Dec. 9, 2009

(65) Prior Publication Data

US 2010/0141992 A1 Jun. 10, 2010

(30) Foreign Application Priority Data

Dec. 10, 2008 (JP) ................................. 2008-314608

(51) Int. Cl.
*G06F 3/00* (2006.01)
*G06F 13/00* (2006.01)

(52) U.S. Cl.
USPC .............................................. 710/36; 710/33

(58) Field of Classification Search
CPC ............................ G06F 3/04817; G06K 15/00
USPC ...................................................... 710/33, 36
See application file for complete search history.

(56) References Cited

U.S. PATENT DOCUMENTS 5,729,685 A * 3/1998 Chatwani et al. ............. 709/224
6,633,913 B1 10/2003 Chalstrom et al.
2002/0133564 A1 * 9/2002 Takayama ..................... 709/217
2006/0146361 A1 7/2006 Adams et al.
2006/0288071 A1 * 12/2006 Bigioi et al. .................. 709/203
2007/0171468 A1 7/2007 Tanji
2007/0206088 A1 * 9/2007 Mizunashi et al. ......... 348/14.01
2009/0138802 A1 * 5/2009 Yamashita ..................... 715/719

FOREIGN PATENT DOCUMENTS

EP 1762923 3/2007
JP 10-111793 4/1998
JP 2002-271561A A 9/2002

* cited by examiner

*Primary Examiner* — Ernest Unelus
*Assistant Examiner* — Ronald Modo
(74) *Attorney, Agent, or Firm* — Canon USA Inc. IP Division

(57) ABSTRACT

An image processing apparatus which is connected to a plurality of information processing apparatuses receives notification information, which includes information about each information processing apparatus and is transmitted from the plurality of information processing apparatuses, and displays an information processing apparatus corresponding to the notification information as a list. When a deletion instruction to delete a specific information processing apparatus from among the information processing apparatuses that are objects to be displayed is accepted, the image processing apparatus deletes the specific information processing apparatus from the list. After the specific information processing apparatus is deleted from the list, the image processing apparatus displays other information processing apparatus corresponding to the received notification information instead of the information processing apparatus that has been deleted, so that the other information processing apparatus can be selected as a transmission destination of image data.

7 Claims, 16 Drawing Sheets

FIG.6

| ITEM | CONTENTS |
|---|---|
| NAME | CLIENT PC 103 |
| BUTTON NAME 1 | SCAN 1 |
| COMMENT 1 | COLOR, A4 |
| BUTTON NAME 2 | SCAN 2 |
| COMMENT 2 | COLOR, A3 |
| BUTTON NAME 3 | SCAN 3 |
| COMMENT 3 | MONOCHROME, A3 |
| BUTTON NAME 4 | SCAN 4 |
| COMMENT 4 | MONOCHROME, A4 |

IMAGE PROCESSING APPARATUS, METHOD FOR CONTROLLING THE IMAGE PROCESSING APPARATUS, AND COMPUTER-READABLE STORAGE MEDIUM

BACKGROUND OF THE INVENTION

1. Field of the Invention

The present invention relates to an image processing apparatus that can be connected to a plurality of information processing apparatuses, wherein the image processing apparatus has a function for transmitting image data to an information processing apparatus selected by a user, a method for controlling the image processing apparatus, and a computer program.

2. Description of the Related Art

When an image processing apparatus equipped with a scanner apparatus is provided in a network environment, the image processing apparatus can be used to scan a document. In this case, a driver installed and operable on a client computer can be generally used by a user of the client computer to operate the image processing apparatus. More specifically, the user who operates the client computer can use a scanner driver to instruct the image processing apparatus to perform scan processing and to acquire image data that is read by the scanner. The processing method described above is generally referred to as "Pull Scan processing."

On the other hand, the user can operate the image processing apparatus to perform scan processing and cause the image processing apparatus to transmit image data read by the scanner to the client computer. The latter method is also widely known and is referred to as "Push Scan processing."

Further, as discussed in Japanese Patent Application Laid-Open No. 10-111793, according to another method that is derived from the "Push Scan processing" method, a user can operate the image processing apparatus to activate a driver operable on a client computer to perform the "Pull Scan processing." The processing method discussed in Japanese Patent Application Laid-Open No. 10-111793 is referred to as "quasi-Push Scan processing."

In performing the "Push Scan processing" or the "quasi-Push Scan processing", users are required to select a client computer that serves as a transmission destination of image data by operating an operation panel of the image processing apparatus. Accordingly, the image processing apparatus that can perform the "Push Scan processing" or the "quasi-Push Scan processing" is required to store information relating to one or more client computers.

In this case, to increase the usability of the image processing apparatus, it is desired to prevent a client computer that is not currently operated from being designated as a transmission destination of image data. As a method for realizing the above-described control, it is useful that each client computer periodically transmits a notification to the image processing apparatus. In this case, the image processing apparatus can check an operating status of each client computer referring to the notification periodically transmitted from the client computer. On the other hand, the image processing apparatus can return its own operating status to a client computer in response to a notification received from the client computer. Therefore, each client computer can check the operating status of the image processing apparatus.

In this case, a frequency in transmitting notifications from a client computer to the image processing apparatus, and a total number of client computers are factors that have significance. For example, if one of the client computers transmits notifications to the image processing apparatus every five seconds, the notifications is transmitted twelve times per minute. In this case, the image processing apparatus is required to return responses twelve times per minute. If a total of five client computers transmit notifications to a single image processing apparatus at the same frequency, the image processing apparatus is required to return responses 60 times per minute.

Recently, for a purpose of reducing costs, each image processing apparatus has been required to reduce capacity of a memory installed thereon. Accordingly, many of the recent image processing apparatuses has not been equipped with a mass storage apparatus such as a hard disk. It is, therefore, required to reduce an excess processing load on the image processing apparatus.

To this end, setting an upper limit to restrict the total number of client computers that can be managed by one image processing apparatus is a method for reducing the processing load on the above-described image processing apparatus.

The following method is employable when the upper limit is set to restrict the total number of client computers that can be managed by the image processing apparatus considering the above-described circumstance. More specifically, the image processing apparatus can successively register each client computer that has notified its operating status. When the number of the registered client computers reaches the upper limit, the image processing apparatus can terminate registration of the client computers. In this case, a client computer that later notifies an operating status cannot be registered by the image processing apparatus. The image processing apparatus returns no response to the client computer that was not registered.

However, according to the above-described method for restricting the total number of client computers to be managed by the image processing apparatus, if a user arbitrarily selects a transmission destination of image data via the operation panel of the image processing apparatus, a client computer that the user wants to designate may not be displayed because the client computer that the user wants to designate is not constantly managed as one of the client computers within the upper limit.

SUMMARY OF THE INVENTION

Exemplary embodiments of the present invention are directed to a technique which enables a user to surely select a desired transmission destination when the user operates an image processing apparatus to select the transmission destination of image data.

According to an aspect of the present invention, an image processing apparatus connectable to a plurality of information processing apparatuses transmits image data to an information processing apparatus selected by a user. The image processing apparatus includes a reception unit adapted to receive notification information which includes information about each information processing apparatus and is transmitted from the plurality of information processing apparatuses, a display unit adapted to display an information processing apparatus corresponding to the notification information received by the reception unit, an acceptance unit adapted to accept a deletion instruction to delete a specific information processing apparatus from among the information processing apparatuses that are designated as objects to be displayed on the display unit, and a deletion unit adapted to, when the deletion instruction is accepted by the acceptance unit, delete the specific information processing apparatus from the objects to be displayed, wherein the display unit is adapted to display other information processing apparatus corresponding to the notification information received by the reception unit, instead of the information processing apparatus that has been deleted, after the specific information processing apparatus is deleted by the deletion unit from the objects to be displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of notification information that can be transmitted from the driver application module according to an exemplary embodiment of the present invention.

DESCRIPTION OF THE EMBODIMENTS

Various exemplary embodiments, features, and aspects of the invention will be described in detail below with reference to the drawings.

Figure 1:
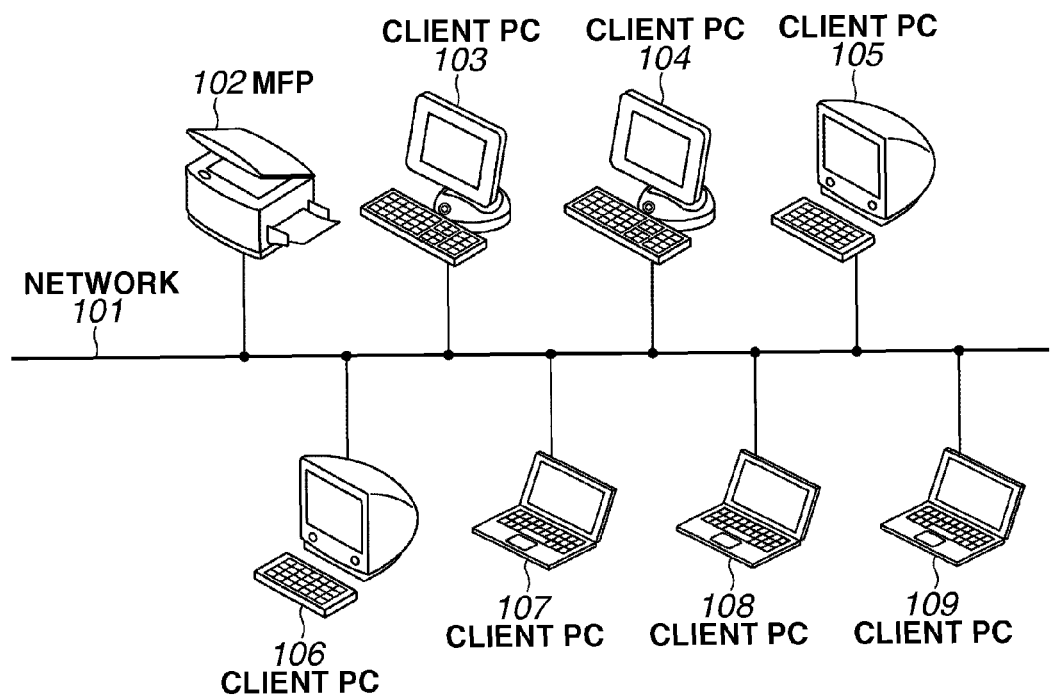
FIG. 1 illustrates an example of a schematic system configuration which includes a multifunction peripheral (MFP) and a plurality of client personal computers (PCs) according to an exemplary embodiment of the present invention.

FIG. 1 illustrates an example of a configuration of an image processing system according to an exemplary embodiment of the present invention.

In FIG. 1, a network 101 employs a conventional technique for connecting a plurality of devices as described below. The network 101 is, for example, Ethernet (registered mark) that uses a transmission control protocol/internet protocol (TCP/IP) protocol. The network 101 can be replaced with any other network, such as a wireless network. A multifunction peripheral (MFP) 102 is an example of an image processing apparatus that is equipped with a scanner apparatus. A plurality of client PCs 103 to 109, each serving as an example of an information processing apparatus, can communicate with the MFP 102 via the network 101. When an operator operates the MFP 102, each client PC can receive a processing execution request from the MFP 102. The client PC further enables users to perform settings for the MFP 102 and input a processing execution request to be transmitted to the MFP 102.

Figure 2:
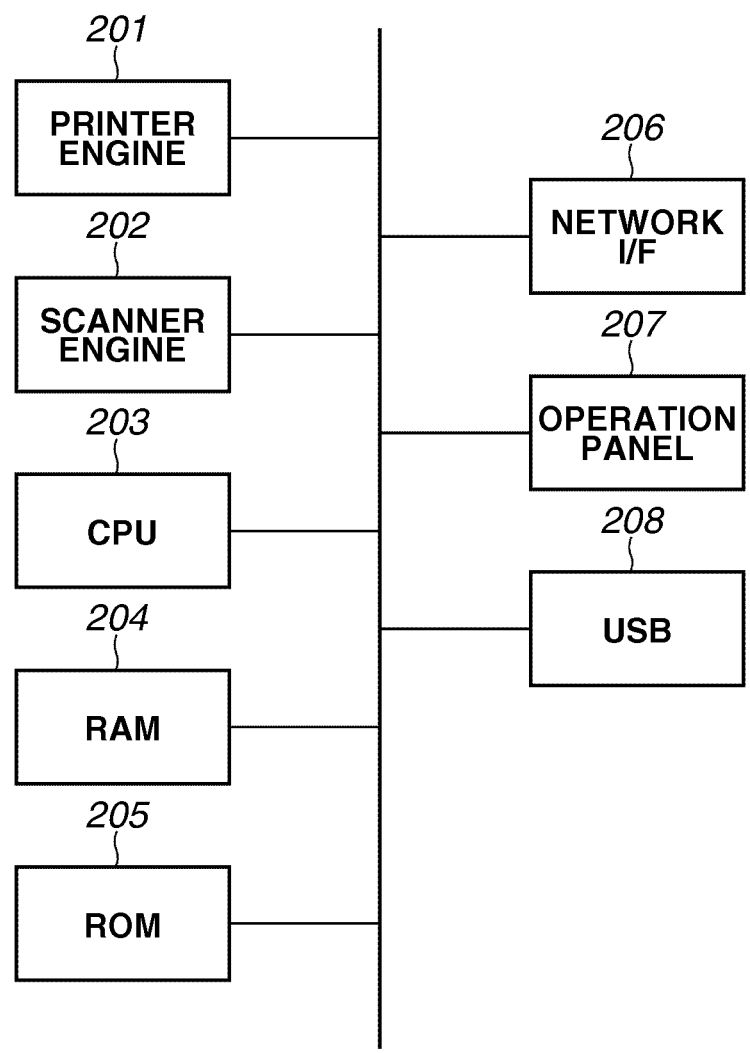
FIG. 2 is a block diagram illustrating an example of a configuration of the MFP according to an exemplary embodiment of the present invention.

FIG. 2 illustrates an example of a hardware configuration applicable to the MFP 102. In FIG. 2, a printer engine 201 is operable according to a conventionally-known printing technique (such as an electro-photographic method or an inkjet method). A scanner engine 202 is operable according to a conventionally-known optical reading technique to read an original and generate image data. A central processing unit (hereinafter, referred to as "CPU") 203 can control an overall operation of the MFP 102. A read only memory (ROM) 205 can serve as a storage unit configured to store operation control programs to be executed by the CPU 203 and other various data.

A network interface (I/F) 206 is a device provided for communication via the network 101. The network I/F 206 enables the MFP 102 to communicate with an external device (such as a client PC) on the network via the network 101. An operation panel 207 can provide a user interface. For example, the operation panel 207 includes a display unit (e.g., a liquid crystal device or a light emitting device (LED)) and a plurality of operation buttons. A random access memory (RAM) 204 can function as a storage unit configured to temporarily store the image data to be printed by the printer engine 201 as well as image data transmitted/received via the network I/F 206. A universal serial bus (USB) port 208 enables the MFP 102 to access an external USB apparatus, such as a USB memory.

Figure 3:
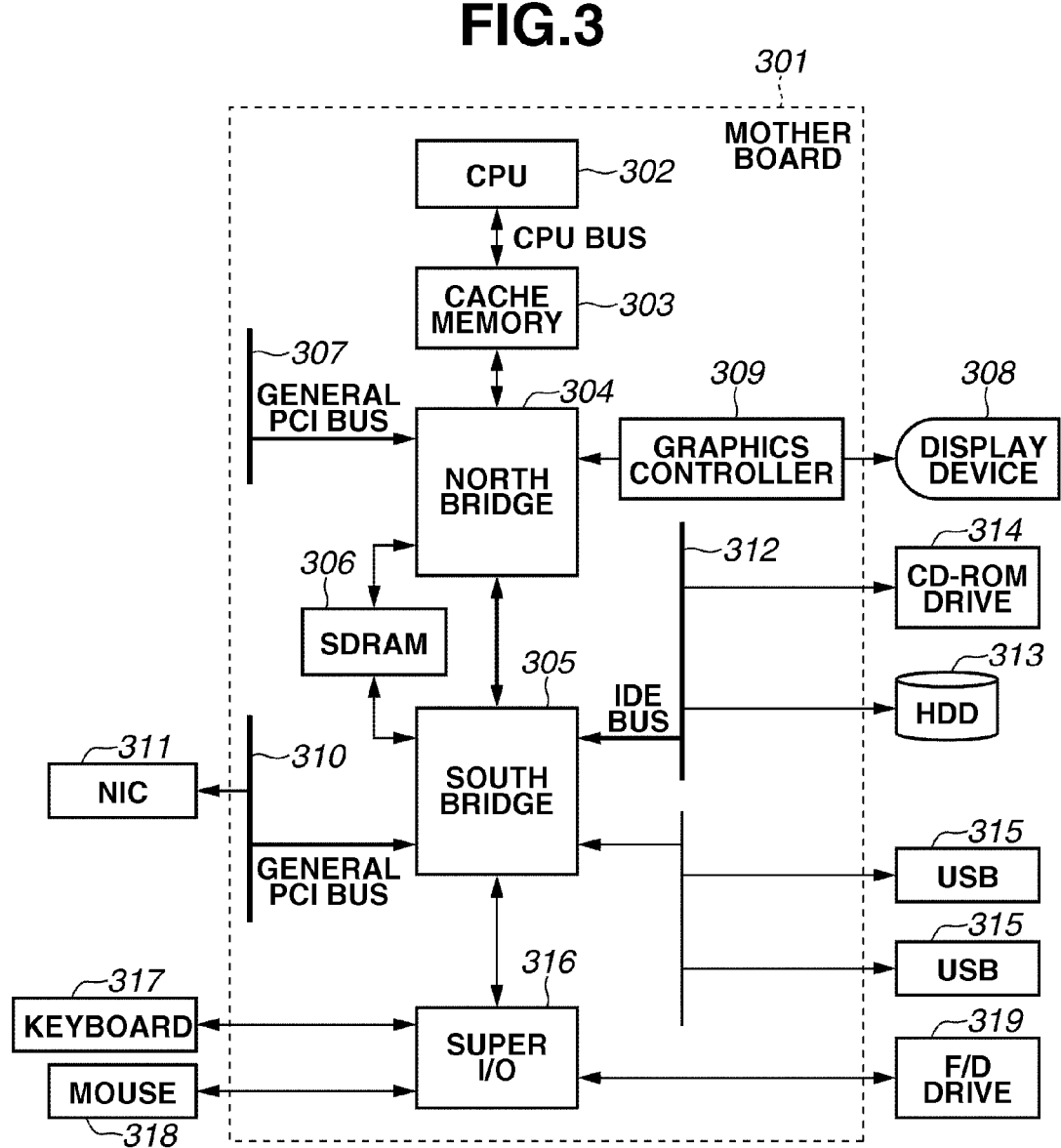
FIG. 3 is a block diagram illustrating an example of a configuration of a client PC according to an exemplary embodiment of the present invention.

FIG. 3 illustrates an example of a hardware configuration applicable to each of the client PCs 103 to 109. Various connection methods and various arrangements including buses and interfaces are employable for the hardware configuration of each PC, as generally known. The hardware configuration illustrated in FIG. 3 is a mere example.

In FIG. 3, a portion encircled by a dotted line is a mother board 301. The mother board 301 includes a CPU 302 that can communicate via a cache memory 303 with a north bridge 304 and a south bridge 305. The CPU 302 can control an entire operation to be performed by the software of the client PC. A synchronous dynamic random access memory (SDRAM) 306 is a memory that can be used for data transmission/reception to be performed between the north bridge 304 and the south bridge 305 and also can be used for temporary storage of internal data processed in each client PC.

The north bridge 304 includes a general protocol control information (PCI) (32 bit/33 MHz) bus 307 to which an external small computer system interface (SCSI) apparatus can be connected optionally (can be connected later if required). The north bridge 304 is also connected to a graphics controller 309 for realize a display on a display device 308.

On the other hand, the south bridge 305 includes another general PCI bus 310. The south bridge 305 can communicate via a network interface card (NIC) 311 with a device connected to a network. The south bridge 305 further includes an integrated drive electronics (IDE) bus 312. A hard disk drive (HDD) 313 is connected to the IDE bus 312. The HDD 313 can store control software for the client PC and various data. A compact disc-ROM (or a CD-recordable (CD-R) or a CD-rewritable (CD-RW)) drive 314 is connected to the IDE bus 312. The CD-ROM drive 314 can be used for data reading, for example, in an installation and for data storage (archives) of massive data in the client PC.

USB ports 315 enable the south bridge 305 to access an external USB apparatus, such as a USB memory. The south bridge 305 is connected via a super in/out (I/O) unit 316 to a keyboard 317, a mouse 318, and a floppy disk (F/D) drive 319, to perform a data input/output operation.

Figure 4:
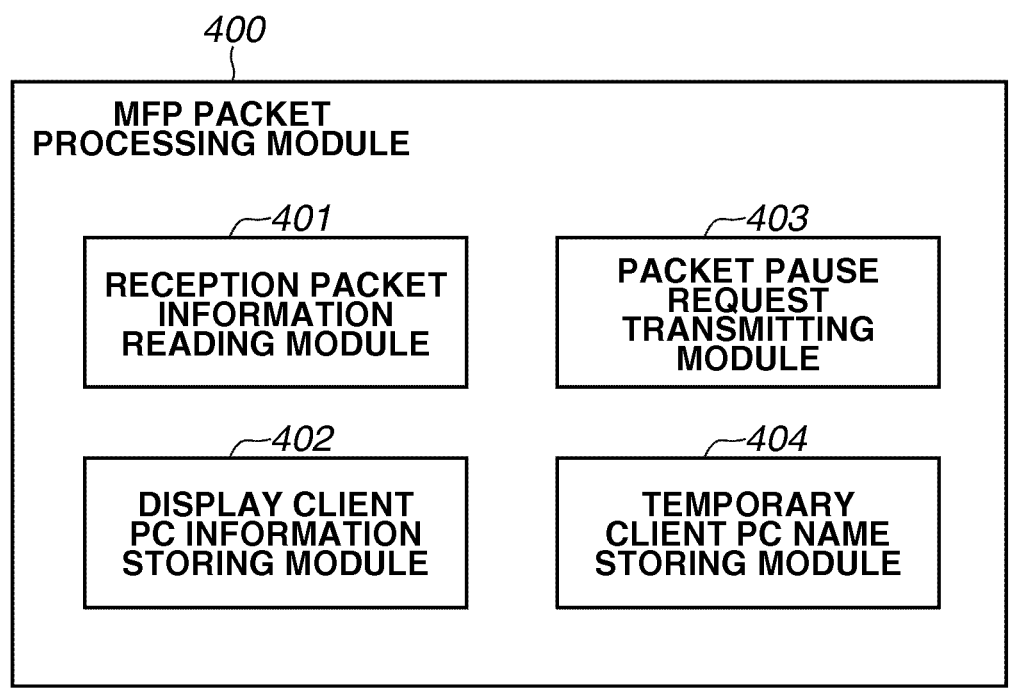
FIG. 4 schematically illustrates an example of a packet processing module of the MFP according to an exemplary embodiment of the present invention.

FIG. 4 schematically illustrates an example of an MFP packet processing module 400 which is one of software modules that can be executed by the CPU 203 of the MFP 102. A detailed configuration of the MFP packet processing module 400 is described below in detail with reference to FIG. 4.

A reception packet information reading module 401 can perform processing for reading contents of a packet (i.e., notification information transmitted from a below-described packet transmitting module 502) that can be received via the network I/F 206 from the client PCs 103 to 109.

A display client PC information storing module 402 can perform processing for storing contents of the packet read by the reception packet information reading module 401 into the storage unit (e.g., the RAM 204 or the ROM 205). In the present exemplary embodiment, an upper limit is set to restrict a total number of the client PCs that can be stored in the display client PC information storing module 402. For example, the upper limit can be set to 5.

When the total number of the client PCs stored by the display client PC information storing module 402 reaches the upper limit, detailed packet contents that can be read by the reception packet information reading module 401 are limited to only those of the stored client PCs. The packet contents of other client PCs are disregarded. The setting of the upper limit for restricting the total number of the client PCs that can be stored in the display client PC information storing module 402 may adversely influence the processing to be performed by the MFP 102. Therefore, it is desired to take a processing load of the MFP 102 into consideration in determining the upper limit. Further, it is desired for an administrator to set an arbitrary value as the upper limit.

A packet pause request transmitting module 403 is a module that can transmit a packet transmission pause request (i.e., a request for pausing transmission of a packet) to a below-described driver application of the client PC.

A temporary client PC name storing module 404 can perform processing for reading a client name from a packet transmitted from the client PC that is not currently displayed on the display unit. The temporary client PC name storing module 404 can further perform processing for storing the read client name in the storage unit, such as the RAM 204 or the ROM 205. The client name stored by the temporary client PC name storing module 404 can be referred to as one of input assistance information when a user inputs a client PC name via the operation panel 207 of the MFP 102.

Figure 5:
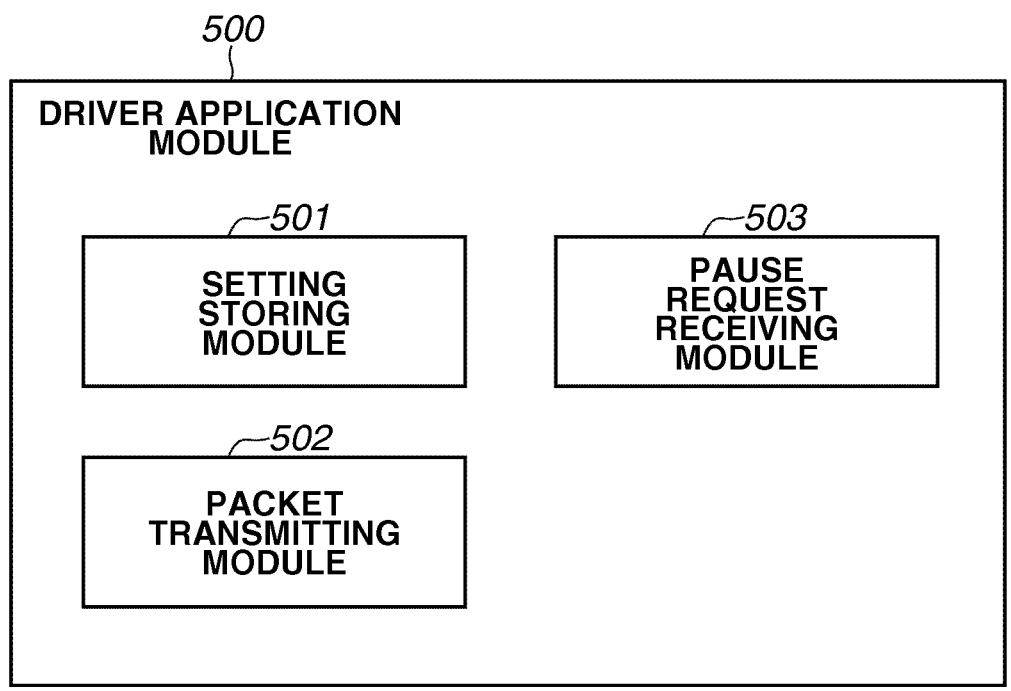
FIG. 5 schematically illustrates an example of a driver application module of the client PC according to an exemplary embodiment of the present invention.

FIG. 5 schematically illustrates an example of a driver application module 500 that can be installed on the client PC. The driver application module 500 can be used to perform a remote operation and settings for the MFP 102. A detailed configuration of the driver application module 500 is described below with reference to FIG. 5.

A setting storing module 501 can perform processing for storing data relating to the Pull scan setting that have been set by a user using a driver application in a memory provided in the client PC.

The packet transmitting module 502 can perform processing for periodically transmitting, to the MFP 102, a packet of notification information including client PC information (i.e., identification information that can identify the client PC) and setting information relating to the Pull scan.

A pause request receiving module 503 can receive a packet transmission pause request from the MFP 102. In response to the received packet transmission pause request, the pause request receiving module 503 instructs the packet transmitting module 502 to stop transmitting the packet for a predetermined period of time. Further, the pause request receiving module 503 is configured to count an elapsing predetermined period of time. When the predetermined period of time has elapsed, the pause request receiving module 503 instructs the packet transmitting module 502 to restart transmitting the packet.

FIG. 6 illustrates an example of the notification information to be transmitted to the MFP 102 by the packet transmitting module 502 of the driver application module 500. In the present exemplary embodiment, the information contained in the notification information packet includes three items of a client PC "name" (e.g., a host name effective on the network), a "button name" that can be used to select a scan setting, and a "comment" that indicates detailed contents of each scan setting.

The scan setting is reading settings (e.g., size and resolution) for reading an original with a scanner. In the present exemplary embodiment, a user is allowed to register a plurality of items for one button as reading settings. An example of the reading settings is described below with reference to FIG. 8. The notification information to be transmitted to the MFP 102 by the packet transmitting module 502 may include other information in addition to the above-described information. For example, the notification information includes address information that can be used to specify each client PC on the network.

Figure 7:
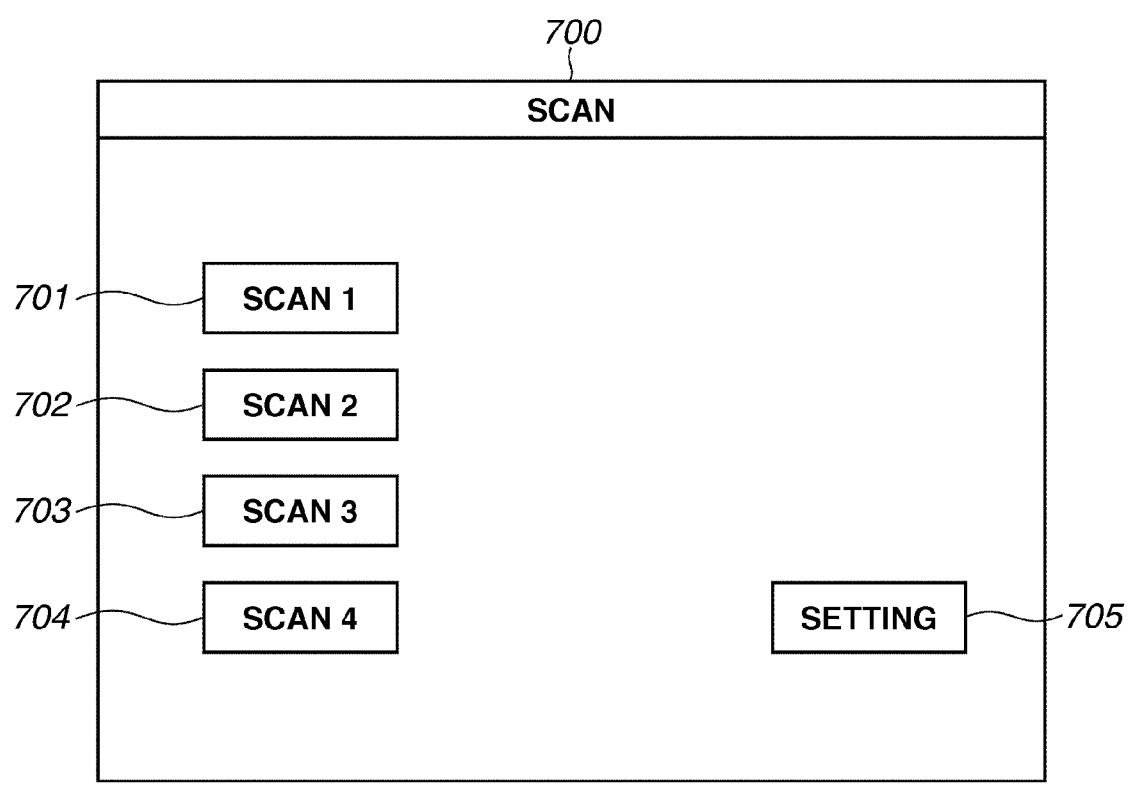
FIG. 7 illustrates an example of a display screen that can be displayed by the client PC according to an exemplary embodiment of the present invention.

FIG. 7 illustrates an example of a screen 700 that can be provided by the driver application module 500. The display device 308 of the respective client PCs 103 to 109 can display the screen 700. More specifically, the screen 700 can be displayed on the display device of the client PC when a user operates the client PC to instruct the Pull scan processing. The screen 700 includes a plurality of buttons 701 to 704 to which custom scan settings are allocated respectively so that users can designate a desired reading operation.

The driver application module 500 according to the present exemplary embodiment enables a user to register four custom scan settings. If any one of buttons 701 to 704 is pressed, the client PC transmits a scan instruction and setting information relating to the scan settings to the MFP 102. In response to the scan instruction received from the client PC, the MFP 102 starts reading an original and performs processing required based on the received setting information. Then, the MFP 102 transmits image data to the client PC.

Figure 8:
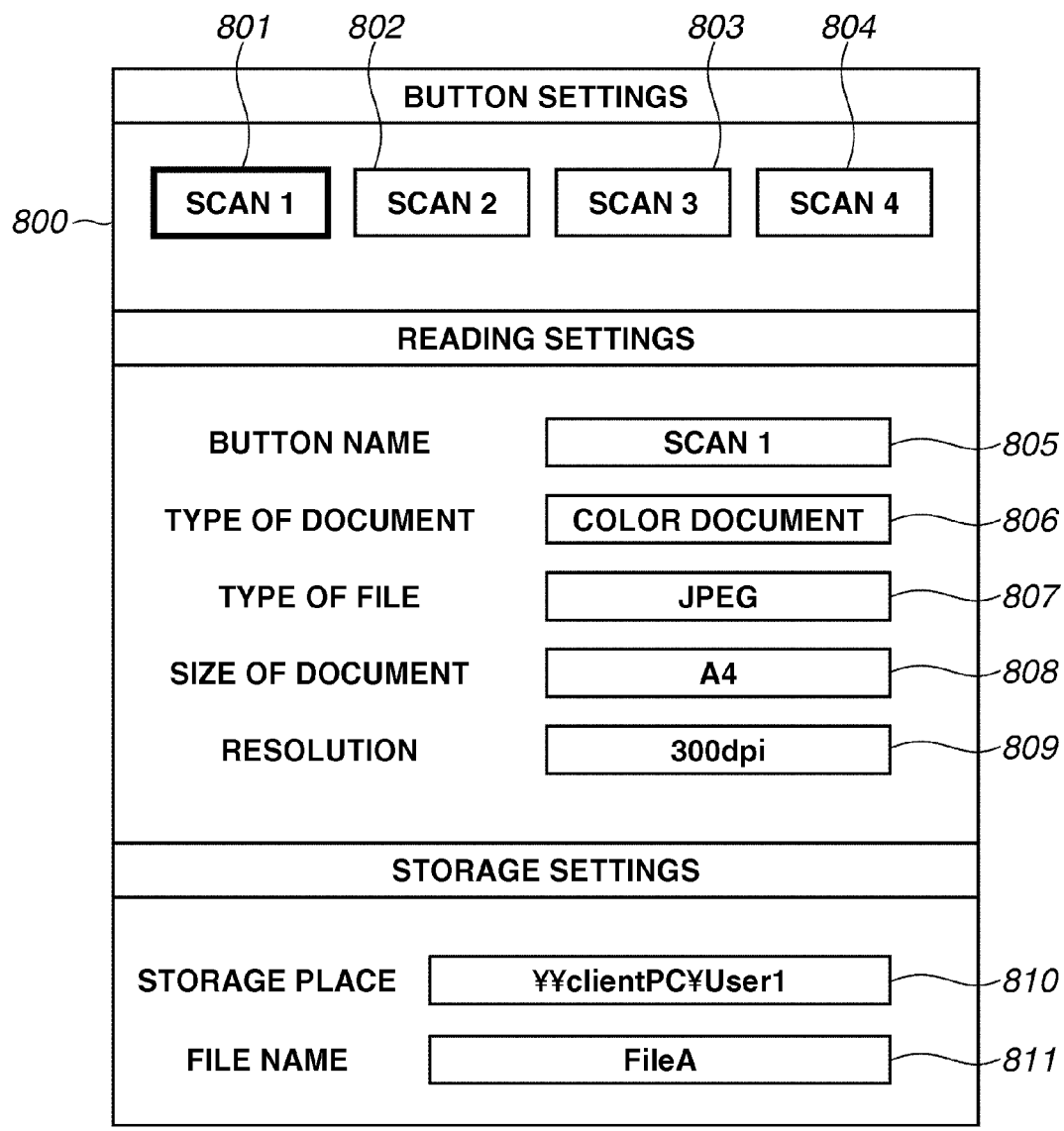
FIG. 8 illustrates an example of a display screen that can be displayed by the client PC according to an exemplary embodiment of the present invention.

An example of the custom scan settings that can be allocated to the above-described buttons 701 to 704 is described below with reference to FIG. 8. If a "setting" key 705 illustrated in FIG. 7 is pressed on the driver screen, a screen 800 illustrated in FIG. 8 can be displayed on the display device. In the present exemplary embodiment, a user is allowed to select a desired one of the custom settings by pressing one of buttons 801 to 804 on the screen 800 illustrated in FIG. 8.

For example, the user can press the button 801 to perform the custom setting for a "scan 1" key. Through the above-described selection operation, custom setting values that have been previously input by the user (or default setting values if the custom setting values are not previously input) can be displayed in respective fields 805 to 811. The present exemplary embodiment allows the user to change the displayed setting values to desired values. For example, the input field 805 enables the user to change the name of the custom scan key. If the name of a button is changed in the screen 800, a changed button name can be displayed on a below-described screen of the MFP 102.

The input field 806 enables a user to designate a color/monochrome type for an original reading operation. As an example of the color/monochrome type, the user can select a color document or a monochrome document. The input field 807 enables a user to designate a file format of image data to be generated, such as Joint Photographic Experts Group (JPEG), tagged image file format (TIFF), portable document format (PDF), or bitmap (BMP). The input field 808 enables a user to designate a size of an original to be scanned. The input field 809 enables a user to designate a resolution of an image in the scan processing. The input field 810 enables a user to designate a storage place (path) of the scanned image. According to the example illustrated in FIG. 8, a directory "User1" of the client PC is designated as the storage place. The input field 811 enables a user to designate a name of a storage file.

As described above, the present exemplary embodiment performs image processing on scanned image data based on the setting values in the fields 806 to 809 to obtain desired image data. The above-described image processing can be performed by the MFP 102 or one of the client PCs 103 to 109.

Figure 9:
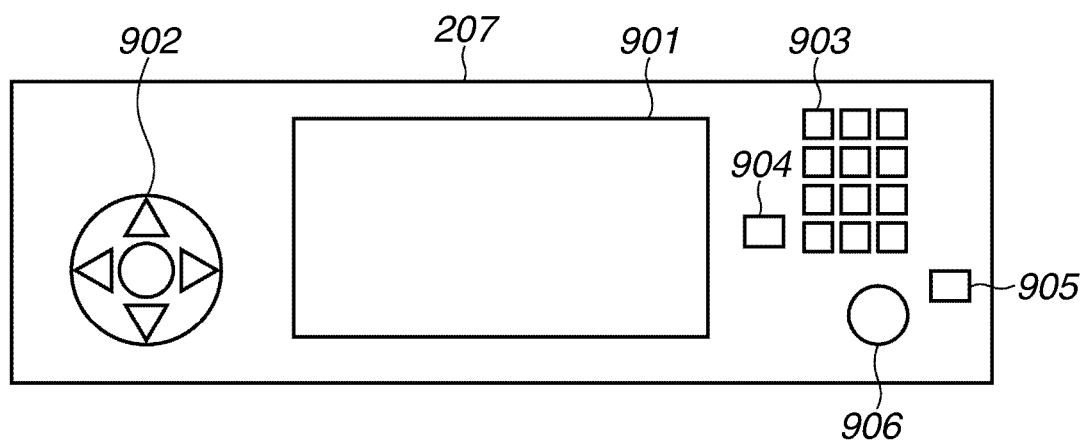
FIG. 9 illustrates a configuration of an operation panel of the MFP according to an exemplary embodiment of the present invention.

FIG. 9 illustrates a detailed configuration of the operation panel 207 of the MFP 102. The operation panel 207 includes a liquid crystal display (LCD) 901, a menu selection key 902, a numerical keypad 903, a reset key 904, a stop key 905, and a start key 906. In the present exemplary embodiment, the above-described keys 902 to 906 are hard keys.

The menu selection key 902 includes a scroll key (i.e., a key operable in both an up-and-down direction and a right-and-left direction) that can be used to select a menu to be displayed on the LCD 901 and a key that can be pressed to determine a selection item. The numerical keypad 903 is a key that can be operated to directly input a numerical value (e.g., a total number of copies). The reset key 904 can be operated to clear a setting incomplete state and change the setting values to initial values. The start key 906 can be operated to instruct starting a designated job. The stop key 905 can be operated to input an instruction to stop the job that is currently executed. Examples of the screens to be displayed on the LCD 901 are described below with reference to FIGS. 10 to 14.

Next, a mechanism for displaying, on the operation panel of the MFP 102, a client PC that can serve as a transmission destination of the image data scanned by the MFP 102 is described below.

Figure 10:
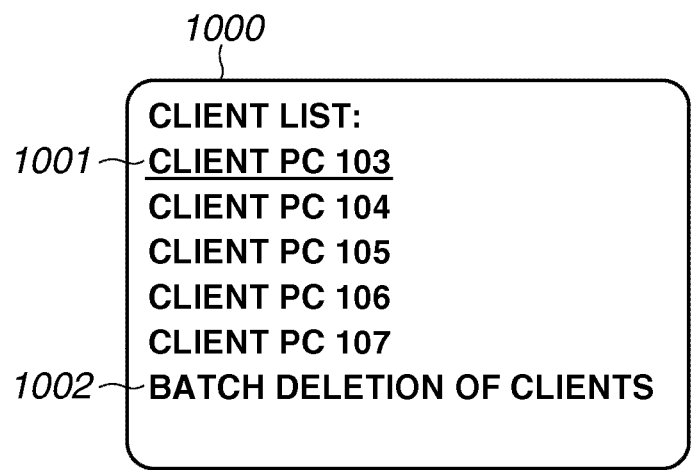
FIG. 10 illustrates an example of a screen that can be displayed on a display unit of the MFP according to an exemplary embodiment of the present invention.
Figure 11:
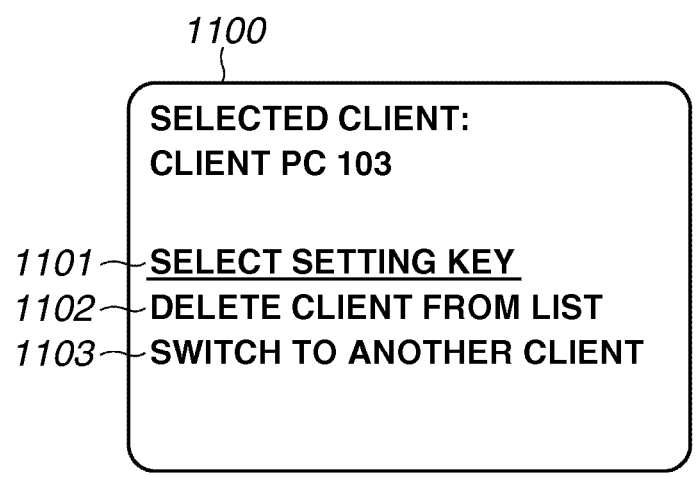
FIG. 11 illustrates an example of a screen that can be displayed on the display unit of the MFP according to an exemplary embodiment of the present invention.

The packet transmitting module 502 of the driver application module 500 which is operable on each client PC connected to the network 101 transmits the above-described notification information packet to the MFP 102. When the MFP 102 receives the notification information from a client PC, the MFP 102 can identify the presence of the client PC. The MFP 102 thus displays a list of corresponding client PCs on the LCD 901 of the operation panel 207 as illustrated in FIG. 10. The information displayed in this case is client PC "name" information, which is one of the examples of the notification information illustrated in FIG. 6. The above-described client PC list display based on the transmission/reception of the notification information packet is described below in more detail.

The driver application module 500 of respective client PCs 103 to 109 is configured to execute the packet transmission periodically at predetermined intervals. Therefore, the periodical transmission of the notification information packet is continuously performed unless the transmission is intentionally stopped by a user. When the MFP 102 receives the notification information packet from the driver application of each client PC, the MFP 102 reads the contents thereof and adds the read contents to a list to be displayed. If the notification information packet is received within a predetermined period of time, the MFP 102 displays a corresponding client PC on the list. If no notification information packet is received within the predetermined period of time, the MFP 102 automatically deletes a corresponding client PC from the list to be displayed.

In the present exemplary embodiment, the maximum number of the client PCs that can be displayed on the list is limited to 5. Therefore, if a notification information packet is transmitted from the sixth or subsequent client PC, the sixth or subsequent client PC cannot be displayed on the list unless any one of the client PCs currently displayed is deleted. For example, when the client PCs 103 to 107 (i.e., a total of five client PCs) are already displayed on the list as illustrated in FIG. 10, the MFP 102 does not accept the client PC 108 or the client PC 109 (i.e., another client PC connected to the network 101) as a client PC to be displayed on the list even if the client PC 108 and the client PC 109 continuously transmit the notification information packets.

Figure 15:
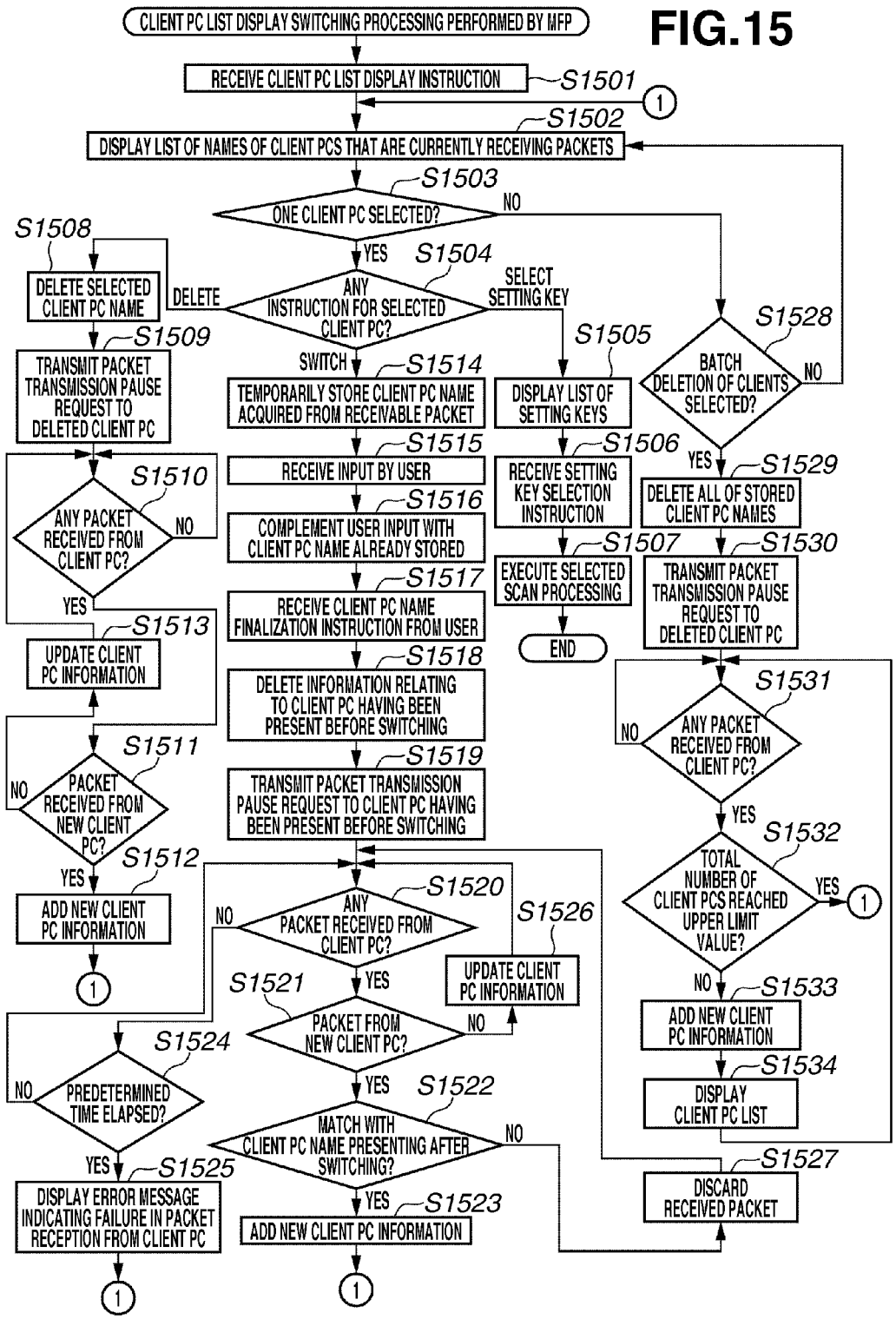
FIG. 15 is a flowchart illustrating an example of processing that can be performed by the MFP according to an exemplary embodiment of the present invention.

Next, an example of a client PC list display switching flow that can be performed by the MFP 102 is described below with reference to a flowchart illustrated in FIG. 15. To realize each step illustrated in FIG. 15, the CPU 203 of the MFP 102 can control each functional unit based on a computer program (e.g., the MFP packet processing module 400 illustrated in FIG. 4) stored in the ROM 205.

In step S1501, the CPU 203 receives a client PC list display instruction that can be input by a user via the operation panel 207. In response to the client PC list display instruction, in step S1502, the CPU 203 causes the LCD 901 to display names of client PCs, as illustrated in FIG. 10, that are in a currently packet transmitting state and have been stored in the storage unit by the display client PC information storing module 402.

Next, in step S1503, the CPU 203 determines whether the user has selected one of the client PCs displayed in step S1502. If the user selects the "client PC103" which is an item 1001 displayed on a client PC list display screen 1000, the CPU 203 causes the LCD 901 to display a processing selection screen 1100 illustrated in FIG. 11. The user can select any one of items 1101 to 1103 displayed on the processing selection screen 1100 illustrated in FIG. 11 to instruct the following processing to be performed for the selected client PC.

In step S1504, the CPU 203 receives the user's instruction with respect to the processing to be performed for the selected client PC and determines the contents of the processing. In this case, it is assumed that the user selects the item "select setting key" 1101 (i.e., one of three items displayed on the client PC selection screen 1100). In this case, in step S1505, the CPU 203 reads information relating to the client PC103 that is stored in the storage unit by the display client PC information storing module 402 of the MFP packet processing module 400.

Figure 12:
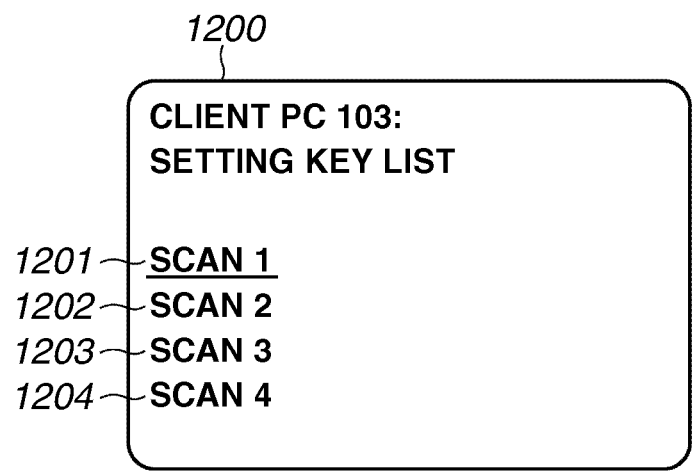
FIG. 12 illustrates an example of a screen that can be displayed on the display unit of the MFP according to an exemplary embodiment of the present invention.

Then, the CPU 203 causes the LCD 901 to display a setting key selection screen 1200 illustrated in FIG. 12. The user can select any one of scan setting keys 1201 to 1204 illustrated in FIG. 12 to instruct a scan setting to be executed. In step S1506, the CPU 203 receives information instructing the scan setting that was selected by the user (i.e., one of the setting keys 1201 to 1204 illustrated in FIG. 12). Then, in step S1507, the MFP 102 executes the selected scan processing and terminates the processing illustrated in FIG. 15.

On the other hand, if a client PC that is desired by the user as a transmission destination of image data is not present in the client PC list display screen 1000 displayed in step S1502, the user is required to instruct switching of the display so that the desired client PC can be displayed. If the user wants to replace the client PC103 by another client PC, the user selects the item. "delete client from list" 1102 or the item "switch to another client" 1103.

If the user selects the item "delete client from list" 1102, then in step S1508, the CPU 203 deletes information relating to the client PC103 that was stored in the storage unit by the display client PC information storing module 402. Subsequently, in step S1509, the CPU 203 causes the packet pause request transmitting module 403 to transmit a packet transmission pause request to the deleted client PC103.

In step S1510, the CPU 203 confirms whether there is any notification information packet received from one of the client PCs. If the CPU 203 confirms the packet reception (YES in step S1510), then in step S1511, the CPU 203 confirms whether the received notification information packet is a packet received from a new client PC.

In the present exemplary embodiment, the new client PC is a client PC whose information is not yet stored by the display client PC information storing module 402. In the present exemplary embodiment, the packet transmission from the client PC103 is temporarily stopped and the information relating to the client PCs 104 to 107 are already stored. Therefore, the new client PC is the client PC 108 or the client PC 109.

If the received notification information packet is the notification information packet from the new client PC (YES in step S1511), then in step S1512, the CPU 203 causes the reception packet information reading module 401 to read information relating to the new client PC. Then, the CPU 203 causes the display client PC information storing module 402 to store the read information in the storage unit. Then, the processing returns to step S1502. In step S1502, the CPU 203 causes the LCD 901 to display an updated client PC list display screen.

On the other hand, if it is determined that the received notification information packet is not the notification information packet from the new client PC, namely when the received notification information packet is from any one of the client PCs that are in the currently packet transmitting state and existing in the list (NO in step S1511), the processing proceeds to step S1513. In step S1513, the CPU 203 updates the information relating to the existing client PCs that has been stored by the display client PC information storing module 402 based on the information read from the received packet.

As described above, when the user selects the item "delete client from list" 1102 in step S1504, the user does not specifically designate a new client PC although the designated client PC is deleted. Therefore, the CPU 203 causes the display client PC information storing module 402 to store a client PC that transmits the notification information packet ahead of other client PCs by replacing the "client PC103" therewith. In this case, the user cannot designate one of the client PC 108 and the client PC 109 as a client PC to be newly displayed.

On the other hand, if a user wants to display a specific client PC regardless of the client PCs that are currently displayed. For example, the user may want to display the client PC 108 rather than the client PC 109. As described above, when the user explicitly designates a new client PC to be displayed, the user can select the item "switch to another client" 1103 on the client PC selection screen 1100.

In this case, the user is required to input a name of the client PC to be displayed to the MFP 102. In the present exemplary embodiment, the MFP 102 can perform processing for assisting the user to input the client PC name.

More specifically, in step S1514, the temporary client PC name storing module 404 temporarily acquires notification information packets from client PCs that are not displayed. The user can operate the operation panel 207 to input a name of a new client PC to be displayed. If the user starts an operation for replacing the "client PC103" name that was originally registered with a new client PC name, then in step S1515, the CPU 203 occasionally receives the information input by the user.

While the user inputs the client PC name, in step S1516, the CPU 203 can complement the client name that is currently input by the user with a client PC name already stored by the temporary client PC name storing module 404. Alternatively, the CPU 203 can display a list of the client PC names that has been stored by the temporary client PC name storing module 404 to enable the user to select a desired new client PC name.

In step S1517, the CPU 203 receives an instruction for finalizing the client PC name that has been input or selected by the user. In the present exemplary embodiment, it is assumed that the user has replaced the "client PC103" with the "client PC 108." Subsequently, in step S1518, the CPU 203 deletes information relating to the replaced client PC103 that was stored in the storage unit by the display client PC information storing module 402. Further, in step S1519, similar to step S1509, the CPU 203 causes the packet pause request transmitting module 403 to transmit a packet transmission pause request to the client PC103 whose information has been deleted.

In step S1520, the CPU 203 confirms whether a notification information packet is received from any one of the client PCs. If the packet reception is confirmed (YES in step S1520), then in step S1521, the CPU 203 confirms whether the packet received in step S1520 is a notification information packet from a new client PC.

If the packet received in step S1520 is the notification information packet from the new client PC (YES in step S1521), then in step S1522, the CPU 203 determines whether the client PC name replaced by the user matches with a client PC name that has been read from the received notification information packet. In this case, the CPU 203 determines whether the client PC name having been read from the received notification information packet is the "client PC 108."

If it is determined that the client PC name replaced by the user matches with the client PC name that has been read from the received notification information packet (YES in step S1522), then in step S1523, the CPU 203 causes the display client PC information storing module 402 to store, in the storage unit, new client PC information read by the reception packet information reading module 401. Then, the processing returns to step S1502. In step S1502, the CPU 203 causes the LCD 901 to display the updated client PC list display screen.

Figure 13:
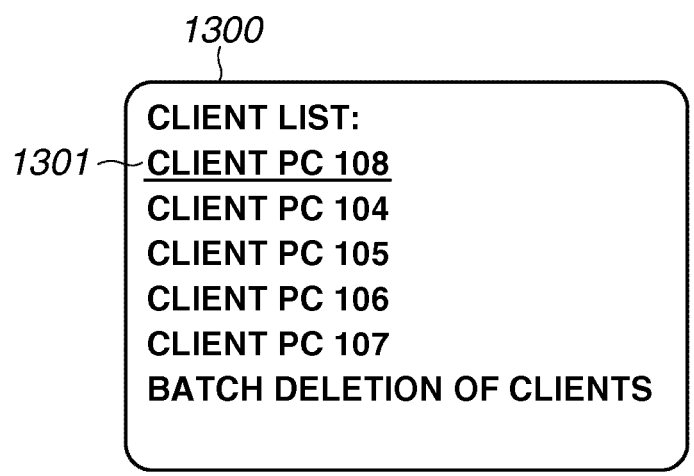
FIG. 13 illustrates an example of a screen that can be displayed on the display unit of the MFP according to an exemplary embodiment of the present invention.

In this case, the client PC list display screen is updated to a client list display screen 1300 illustrated in FIG. 13, which displays an item 1301, the "client PC 108", instead of the "client PC 103"

If the reception of the notification information packet is not confirmed (NO in step S1520), then in step S1524, the CPU 203 determines whether predetermined time has elapsed after the new client PC name was designated by the user.

If it is determined that the predetermined time has elapsed and the notification information packet is not received from the client PC 108 (YES in step S1524), then in step S1525, the CPU 203 causes the LCD 901 to display an error message indicating a failure in packet reception from the client PC 108. Then, the processing returns to step S1502. In step S1502, the CPU 203 causes the LCD 901 to display the client PC list display screen 1000.

The client PC list display screen 1000 to be displayed in this case may include the information of the client PC 103 or may not include the information of the client PC 103.

If it is determined that the packet received in step S1520 is not the notification information packet from the new client PC, but the notification information packet from any one of the client PCs that are in the currently packet transmitting state and existing in the list (NO in step S1521), the processing proceeds to step S1526.

In step S1526, the CPU 203 updates the information relating to the existing client PCs that has been stored by the display client PC information storing module 402, based on the information which has read from the received notification information packet.

If it is determined that the client PC name replaced by the user does not match with the client PC name that has been read from the received notification information packet (NO in step S1522), then in step S1527, the CPU 203 discards the received packet.

As described above, when the user wants to display a specific client PC regardless of the client PCs that are currently displayed, the user can explicitly designate a new client PC to be displayed. In this case, the MFP 102 can assist the user in inputting a name of the new client PC. Therefore, the user can smoothly input the client PC name.

It is assumed that in step S1503 the user has not selected one of the client PCs displayed on the client list display screen 1000. In this case, in step S1528, the CPU 203 determines whether the user has selected an item "batch deletion of clients" 1002 from the client list display screen 1000 illustrated in FIG. 10.

If it is determined that the item "batch deletion of clients" 1002 is not selected (NO in step S1528), the processing returns to step S1502. In step S1502, the CPU 203 causes the LCD 901 to continuously display the client PC list display screen 1000. If it is determined that the item. "batch deletion of clients" 1002 is selected (YES in step S1528), then in step S1529, the CPU 203 deletes, from the storage unit, the information relating to all client PCs that is currently displayed (i.e., the information that was stored by the display client PC information storing module 402).

Subsequently, in step S1530, the CPU 203 causes the packet pause request transmitting module 403 to transmit a packet transmission pause request to each of the displayed client PCs. Then, in step S1531, the CPU 203 confirms whether a notification information packet is received from any one of the client PCs.

If it is confirmed that the notification information packet is received (YES in step S1531), then in step S1532, the CPU 203 determines whether the total number of the client PCs stored by the display client PC information storing module 402 has reached the upper limit (e.g., 5 in the present exemplary embodiment). If it is determined that the total number of the client PCs stored by the display client PC information storing module 402 has not reached the upper limit (NO in step S1532), then in step S1533, the CPU 203 causes the display client PC information storing module 402 to store the new client PC information read by the reception packet information reading module 401 in the storage unit.

Subsequently, in step S1534, the CPU 203 reads the updated display client PC information and causes the LCD 901 to display the client PC list display screen. Then, the processing returns to step S1531, in which the CPU 203 further confirms whether a notification information packet is received from a new client PC. If it is determined that the total number of the client PCs stored by the display client PC information storing module 402 has reached the upper limit (YES in step S1532), the CPU 203 does not receive any packet from the new client PC. Then, the processing returns to step S1502 again.

Figure 14:
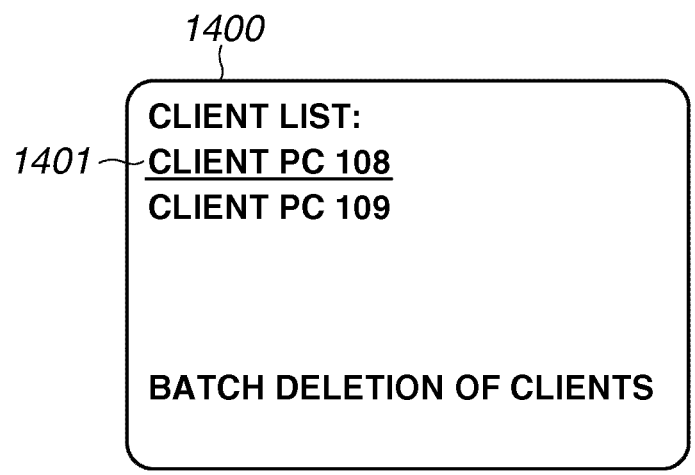
FIG. 14 illustrates an example of a screen that can be displayed on the display unit of the MFP according to an exemplary embodiment of the present invention.

In the present exemplary embodiment, if the item "batch deletion of clients" 1002 is selected, the CPU 203 pauses the transmission of the notification information packet to be performed by the client PCs 103 to 107 as described above. Therefore, the notification information packets that can be received by the CPU 203 are limited to those from the client PCs 108 and 109. Therefore, as illustrated in FIG. 14, names of the client PCs that are displayed on a client PC list screen 1400 are limited to those of the client PCs 108 and 109. Accordingly, when the total number of the client PCs that are connected to the network is a smaller value (see the example illustrated FIG. 1), the user can immediately display a desired client PC by designating the "batch deletion of clients" processing without inputting any client PC name.

Figure 16:
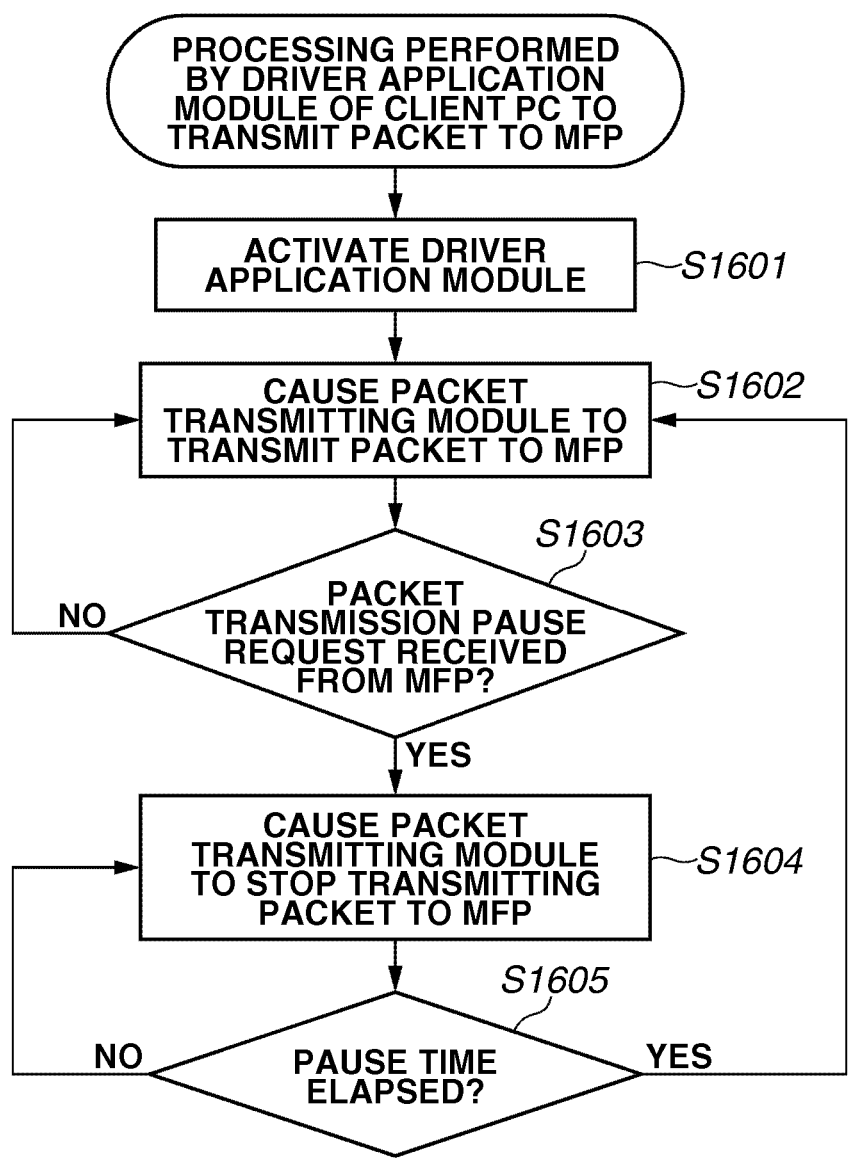
FIG. 16 is a flowchart illustrating an example of processing that can be performed by the client PC according to an exemplary embodiment of the present invention.

Next, an example of processing that can be performed by a client PC to transmit the notification information to the MFP 102 is described below with reference to a flowchart illustrated in FIG. 16. To execute each step illustrated in FIG. 16, the CPU 302 of the client PC can control each functional unit based on a computer program (e.g., the driver application module 500 illustrated in FIG. 5) stored in the memory.

In step S1601, the CPU 302 activates the driver application module 500. The CPU 302 can activate the driver application module 500, for example, when the driver application module is installed on the client PC, and when the client PC is activated. Moreover, a user can manually operate the client PC to activate the driver application module 500.

If the driver application module 500 is activated, then in step S1602, the driver application module 500 causes the packet transmitting module 502 to start transmitting a notification information packet to the MFP 102. The MFP to be a transmission destination of the notification information packet can be automatically detected when the driver application module 500 is installed or can be designated by a user.

After the notification information packet is transmitted, in step S1603, it is confirmed whether a packet transmission pause request is received from the MFP 102. If the packet transmission pause request is not received from the MFP 102 (NO in step S1603), the processing returns to step S1602 after predetermined time has elapsed. In step S1602, the driver application module 500 causes the packet transmitting module 502 to transmit a notification information packet to the MFP 102. If the packet transmission pause request is received from the MFP 102 (YES in step S1603), then in step S1604, the driver application module 500 causes the packet transmitting module 502 to stop transmitting the notification information packet.

After the packet transmission is stopped, in step S1605, it is confirmed whether predetermined pause time has elapsed. If it is determined that the pause time has elapsed (YES in step S1605), then in step S1602, the driver application module 500 causes the packet transmitting module 502 to restart transmitting a notification information packet to the MFP 102. The pause time is longer than predetermined time to be counted when the denial determination is made in step S1603.

As described above, the present exemplary embodiment enables a user to surely select a desired client PC from the information stored in the MFP 102 even when the upper limit is set to restrict the total number of client PCs that can be registered in the MFP 102 as the transmission destination of image data. Then, the present exemplary embodiment transmits the packet transmission pause request to the client PC that has been deleted from the client PC list. In other words, the present exemplary embodiment can stop the processing for transmitting the notification information packet, which may be performed by the client PC that has been deleted from the client PC list, for a predetermined period of time. Accordingly, the present exemplary embodiment can efficiently select a new client as an object to be newly displayed. Further, the present exemplary embodiment allows a user to designate a name of a client PC that the user wants to display on the list. Moreover, the present exemplary embodiment can employ a method for successively switching the client PCs to be displayed instead of displaying a list of a plurality of client PCs (see FIG. 10).

In the above-described exemplary embodiment, the MFP has been described as an example of the image processing apparatus equipped with a scanner apparatus. However, the present invention is not limited to the MFP and can be applied to any other image processing apparatus equipped with a scanner apparatus. Further, in the above-described exemplary embodiment, the MFP allows a user to operate the operation panel provided on the MFP to input an instruction to delete the client PC name from the client PC list displayed on the display unit. Alternatively, a user may be allowed to operate client PCs to input a deletion instruction. More specifically, an exemplary embodiment of the present invention can be configured to allow a user to instruct the MFP to delete an object from the list displayed by the MFP by operating a driver application (or any other software) installed on client PCs. In response to the above-described operation, the client PC transmits the deletion instruction to the MFP. When the MFP receives the deletion instruction, the MFP deletes the designated client PC name from the list.

Aspects of the present invention can also be realized by a computer of a system or apparatus (or devices such as a CPU or MPU) that reads out and executes a computer-executable process recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the computer-executable process is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-314608, filed Dec. 10, 2008, which is hereby incorporated by reference herein in its entirety.

What is claimed is:

1. An image processing apparatus which is able to transmit image data to an information processing apparatus selected by a user, the image processing apparatus comprising:
   a reception unit configured to receive notification information which includes information about each information processing apparatus and is transmitted from each of a plurality of information processing apparatuses;
   a display unit configured to display at least one information processing apparatus among the plurality of information processing apparatuses which has transmitted the notification information received by the reception unit and not to display at least one information processing apparatus among the plurality of information processing apparatuses which has transmitted the notification information received by the reception unit;
   an acceptance unit configured to accept a switch instruction to switch from a first information processing apparatus from among the information processing apparatuses displayed on the display unit to a second information processing apparatus which has transmitted the notification information and has not been displayed by the display unit;
   an input unit configured to accept input by a user of identification information to identify the second information processing apparatus in a case that the switch instruction is accepted by the acceptance unit;
   a determination unit configured to determine whether the notification information from the second information processing apparatus corresponding to the identification information input by the input unit has been newly received by the reception unit; and
   a display control unit configured to delete the first information processing apparatus from the information processing apparatuses displayed on the display unit and to display, as substitute for the deleted first information processing apparatus, the second information processing apparatus in a case that the determination unit determines that the notification information from the second information processing apparatus corresponding to the identification information input by the input unit has been newly received by the reception unit.

2. The image processing apparatus according to claim 1, further comprising a requesting unit configured to request the information processing apparatus that has been deleted from the objects to be displayed to stop transmitting the notification information.

3. The image processing apparatus according to claim 1, wherein an upper limit is set to restrict a total number of the information processing apparatuses that can be displayed on the display unit, wherein the reception unit is configured to discard the received notification information if the information processing apparatuses corresponding to the received notification information is not included as one of the information processing apparatuses within the upper limit.

4. The image processing apparatus according to claim 1, wherein the acceptance unit is configured to accept, from a user, a deletion instruction to delete information processing apparatuses from the objects to be displayed.

5. The image processing apparatus according to claim 1, wherein the notification information includes identification information that can be used to identify each information processing apparatus and a setting relating to image data reading processing, wherein the image processing apparatus transmits image data which is read according to the setting relating to the image data reading processing to the information processing apparatus selected from the apparatuses displayed on the display unit.

6. A method for controlling an image processing apparatus which is able to transmit image data to an information processing apparatus selected by a user, the method comprising:
- receiving notification information which includes information about each information processing apparatus and is transmitted from each of a plurality of information processing apparatuses;
- displaying at least one information processing apparatus among the plurality of information processing apparatuses which has transmitted the received notification information and not to display at least one information processing apparatus among the plurality of information processing apparatuses which has transmitted the notification information received;
- accepting a switch instruction to switch from a first information processing apparatus from among the information processing apparatuses displayed to a second information processing apparatus which has transmitted the notification information and has not been displayed;
- accepting identification information input by a user to identify the second information processing apparatus in a case that the switch instruction is accepted;
- determining whether the notification information from the second information processing apparatus corresponding to the identification information input has been newly received; and
- deleting the first information processing apparatus from the information processing apparatuses displayed and, to display as substitute for the deleted first information processing apparatus, the second information processing apparatus in a case where it is determined that the notification information from the second information processing apparatus corresponding to the inputted identification information, has been newly received 7. A non-transitory computer-readable storage medium storing a computer-executable process, the computer-executable process causing a computer to implement a method for controlling an image processing apparatus which is able to transmit image data to an information processing apparatus selected by a user, the method comprising:
- receiving notification information which includes information about each information processing apparatus and is transmitted from each of a plurality of information processing apparatuses;
- displaying at least one information processing apparatus among the plurality of information processing apparatuses which has transmitted the received notification information and not to display at least one information processing apparatus among the plurality of information processing apparatuses which has transmitted the notification information received;
- accepting a switch instruction to switch from a first information processing apparatus from among the information processing apparatuses displayed to a second information processing apparatus which has transmitted the notification information and has not been displayed;
- accepting identification information input by a user to identify the second information processing apparatus in a case that the switch instruction is accepted;
- determining whether the notification information from the second information processing apparatus corresponding to the identification information input has been newly received; and
- deleting the first information processing apparatus from the information processing apparatuses displayed and, to display as substitute for the deleted first information processing apparatus, the second information processing apparatus in a case where it is determined that the notification information from the second information processing apparatus corresponding to the inputted identification information, has been newly received.

* * * * *